Patented Feb. 9, 1937

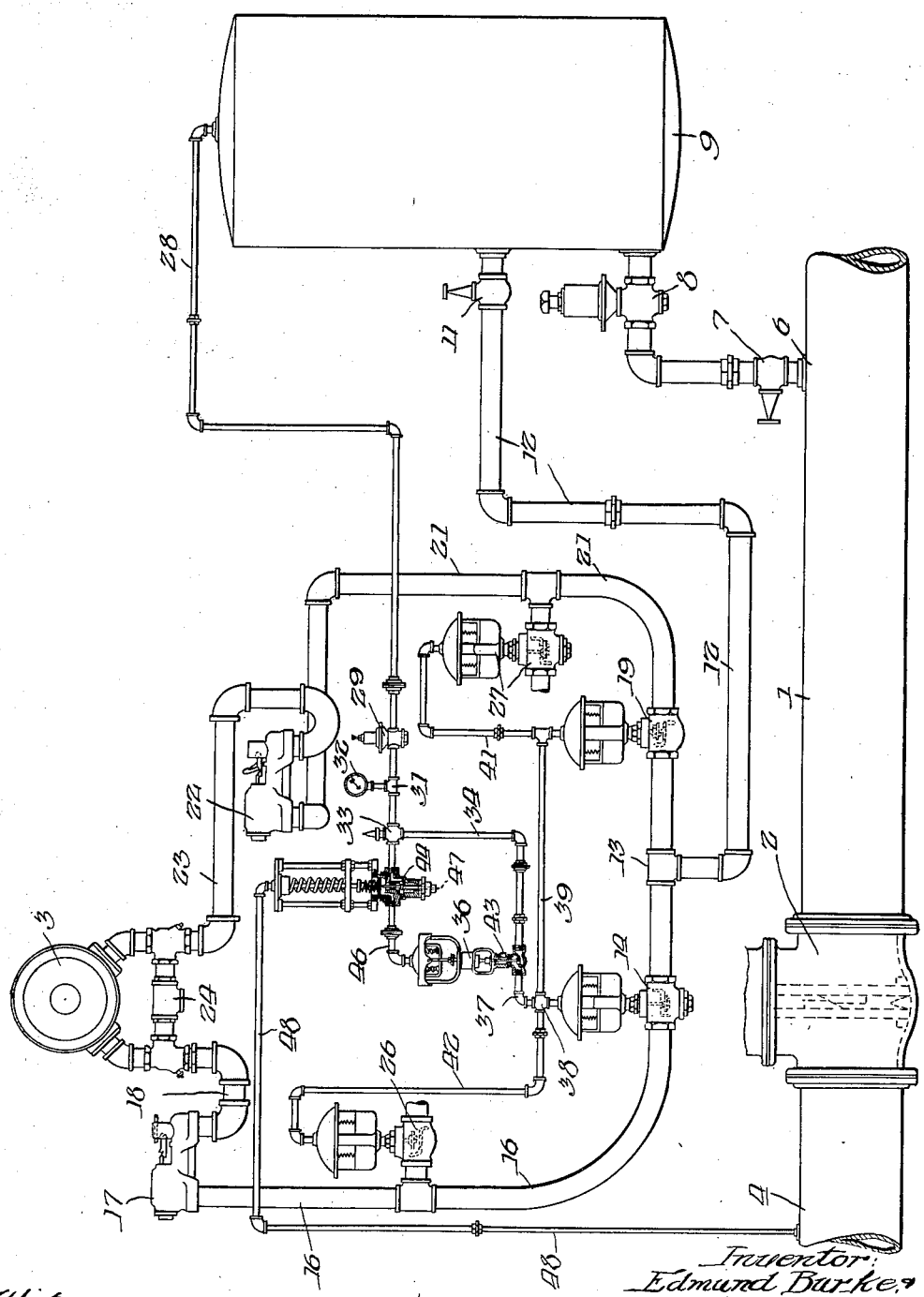

2,069,993

UNITED STATES PATENT OFFICE 2,069,993

AUTOMATIC MOTOR OPERATED PRESSURE REGULATING SYSTEM

Edmund Burke, Oak Park, and Alfred K. Sorensen, Chicago, Ill., assignors to Crane Co., Chicago, Ill., a corporation of Illinois Application June 6, 1932, Serial No. 615,532

5 Claims. (Cl. 50—10)

This invention relates to fluid pressure regulating systems for service where conditions require the use of motor operated valves.

It is frequently necessary to provide for the delivery of fluids at a constant pressure where either or both the source and demand is variable and where the service conditions are such as to require the use of motor operated shut-off valves either because of the pressures involved, the size of the conduits employed, or their inaccessibility. Under such conditions the problems involved in providing for automatic pressure regulation are materially increased.

It is the purpose of this invention to provide a pressure regulating system, automatically operable under the above service conditions, for maintaining a constant delivery pressure regardless of variations in demand and supply as long as the supply is sufficient both as to pressure and volume, and by means of which a motor operated shut-off valve may be utilized as the pressure regulating valve.

In accordance with this invention a motor operated valve in the service pipe is utilized as the regulating valve by controlling its operating motor, a fluid motor in the illustrated embodiment, to open or close the valve in accordance with the pressure conditions in the downstream or discharge side of the valve to raise or lower the same and maintain the desired pressure therein. In order to take care of substantially high pressures and substantially great differentials between discharge pressure and supply pressure, suitable automatically operable control valves are employed to direct and control the fluid supply to the fluid valve motor in accordance with the pressure conditions in the downstream or service side of the regulating valve.

A better understanding of our invention will be obtained from the following description given in connection with the drawing in which the single figure is a diagrammatic representation of a fully automatic system employing a motor operated valve as the pressure regulating valve, and which is supplied and operated in accordance with this invention.

The illustrated embodiment of this invention discloses the system as applied to a high pressure gas line where it is desired to maintain a service at a considerably lower and constant pressure than the supply pressure. The gas line is represented by reference character 1, controlled by a main control or regulating valve 2 which is operated by a reversely operable fluid motor 3 and connects to a service pipe 4 which is the downstream side of the valve 2. Valve 2 and motor 3 may be of any standard commercial construction and are illustrated as of the type disclosed in the Beckwith Patent No. 1,886,518, issued November 8, 1932. The illustrated embodiment is one designed to maintain a constant service supply at approximately 370 pounds per square inch pressure from a source at a pressure of approximately 800 pounds per square inch.

Since the fluid being controlled is a gas which may be used for operating the air motor, the main supply line 1 is tapped as at 6 through a shut-off valve 7 and pressure reducing valve 8 to feed a supply tank 9. The pressure regulator is preferably set for the pressure for which the motor 3 is designed in the present set up, approximately 100 pounds. It will be apparent that any other source of power supply for the fluid motor may be employed where desired or if necessary because of the nature and character of the fluid being transported. Fluid for operating the motor is piped from tank 9 through a shut-off valve 11 and pipe 12 to a T 13, one side of which is connected through a pressure operated single seated diaphragm valve 14 spring closing type and thence through pipe 16 through a torque control valve 17 to one side of the motor through suitable piping 18 for driving the same in closing direction. The other side of T 13 is connected to a second pressure operated single seated diaphragm valve 19 spring opening type and thence through pipe 21 to an automatic limit control valve 22 to the other side of the air motor through suitable piping 23 for driving the motor in opening direction. The motor is exhausted through a suitable cross connection 24.

The torque and limit valves 17 and 22, respectively, are protective devices designed to stop the motor in closing direction upon meeting an obstacle or upon being fully closed, and to stop the motor in opening direction after a predetermined movement of the valve gates have taken place. These safety valves and the connections between them and the air motor are also disclosed in detail in the Beckwith Patent No. 1,886,518, issued November 8, 1932. They form no part of this invention and need not be described in further detail.

The two conduits 16 and 21 leading to the two sides of the motor are exhausted through two auxiliary pressure operated valves 26 and 27, respectively, valve 26 being a single seated diaphragm valve spring opening type whereas valve 27 is a single seated diaphragm valve spring closing type. It will be apparent, of course, that valves 14 and 19 and valves 26 and 27 always take opposite positions respectively, that is, valve 14 is closed and valve 26 is open whenever valve 19 is open. At the same time valve 27 will, of course, be closed whenever valve 19 is open.

The fluid supply to the motor having been described, the control of the various pressure operated motor control valves will now be described. The diaphragm valves 14, 19, 26, and 27 are designed for an operative pressure of approximately 15 pounds per square inch, therefore a separate auxiliary fluid supply must be provided. This supply is obtained from a separate pipe 28 from tank 9 and the pressure is reduced by a pressure reducing valve 29 from which the supply is piped through a T 31 leading to a gauge 32 and a safety valve 33 through pipe 34 to a pressure operated diaphragm quick acting three way auxiliary distributing or control valve 36, the outlet side of which is connected by pipe 37 to a cross 38 which feeds valves 19 and 27 through pipes 39 and 41, respectively, and also feeds valve 26 through pipe 42. The various pressure operated diaphragm valves are so arranged that valve 14 is opened, valve 19 is closed, valve 26 is closed, and valve 27 is opened by pressure upon their diaphragms. Auxiliary control valve 36 is so constructed as to be opened by pressure upon its diaphragm and closed by the action of its springs at which latter position the diaphragms of valves 14, 19, 26 and 27 are vented to the atmosphere through a port 43. When valve 36 is opened by pressure upon its diaphragm the auxiliary fluid supply is admitted to actuate valves 14, 19, 26, and 27.

In the present illustration, relatively high pressures are being controlled even on the low pressure side of gate valve 2 and accordingly it is necessary to employ a control valve which will stand this high pressure to control the quick operating auxiliary control valve 36. Therefore, a control valve 44 is inserted in the pipe 46 feeding the diaphragm of valve 36. Valve 44 is also a pressure operated diaphragm valve of the spring closing type which, when closed, prevents flow of fluid to the diaphragm of valve 36 and at the same time vents the latter valve diaphragm chamber through a port 47 extending through the lower portion of valve 44. When open, valve 44 admits pressure to the diaphragm of valve 36. The diaphragm of the control valve 44 is subject to and is actuated by the pressure on the downstream or service side of the motor operated gate valve 2 which is the pressure to be controlled. For this purpose the downstream side is tapped and pipe 48 connects it with the diaphragm chamber of valve 44.

The operation of the system is as follows: If the service pressure is lower than that for which the system is set, the gate valve 2 should be opened, which condition is illustrated in the drawing. Under these conditions the pressure on pipe 48 is lower than that for which the system is set and control valve 44 is closed by the action of its spring and the quick acting auxiliary control valve 36 is likewise closed. In the closed position of valve 36 the diaphragms of valves 14, 19, 26, and 27 are vented and the valves assume the positions caused by their springs. Accordingly valve 19 is open and valve 27 is closed. Fluid is therefore admitted to the motor through limit valve 22 which causes motor 4 to be rotated in opening direction, thus opening gate valve 2. Under these conditions valve 14 is closed and valve 26 is opened, thus exhausting pressure in line 16.

Whenever pressure of the downstream side 4 becomes higher than the desired value, the diaphragm of control valve 44 will be actuated by pressure in line 48 and open valve 44. Opening valve 44 will admit pressure to the diaphragm of valve 36 and open the latter valve. Opening the valve 36 will place each of the diaphragms of valves 14, 19, 26 and 27 under pressure and actuate the latter valves which will cause valve 19 to close and valve 14 to open and at the same time open exhaust valve 27 and close exhaust valve 26. The air motor will then be fed through pipe 16 and torque valve 17 to rotate the motor in opposite direction to close gate valve 2. The torque and limit switches 17 and 22, respectively, operate to shut off the supply to the air motor in either the fully closed or fully open positions, respectively. The control valve 44 is, of course, set so that the main gate valve will remain open at all pressures, at or under that which is desired to be maintained.

It has been found that by the system heretofore described a simple and positive means for regulating pressures within a small range is provided. Regulation has been brought as close as a three per cent (3%) variation and as close as five pounds above or below the desired pressure when operating at 350 to 400 pounds pressure on the downstream or service side of the gate valve. The arrangement is particularly satisfactory where high pressures and great volumes are encountered and for that reason is also particularly suitable for use on oil and gas service lines and on oil wells where positive control is desired on wells having variable pressures. The arrangement is such that the tank 9 and all auxiliary controls can be grouped into a very compact control for any motor operated valve at any point remote from the valve.

Other novel features and advantages will be apparent to those skilled in the art to whom it will also be obvious that many changes may be made in the details of construction and piping without departing from the spirit and scope of this invention as defined in the claims.

We claim:

1. In a pressure regulating system having a regulator valve for regulating pressure in a pipe line and a fluid motor for operating said regulator valve, a control means therefor comprising a control valve controlled solely by the regulated pressure, means controlled by said control valve for effecting a fluid pressure application and release, a plurality of independent valves operable by said fluid pressure application to assume one operative position and operable upon said release to assume another operative position, and conduits controlled by said plurality of valves whereby in one operative position thereof motive fluid is supplied to the motor for operating it in a direction to open the regulator valve and in the other operative position of said plurality of valves motive fluid is supplied to the motor for operating it in a direction to close the regulator valve, the said conduits each having two of said plurality of valves, the two valves of one conduit comprising a normally open inlet and a normally closed exhaust valve, and the two valves of the other conduit comprising a normally closed inlet valve and a normally open exhaust valve.

2. In a pressure regulating system having a regulator valve for regulating pressure in a pipe line and a fluid motor for operating said regulator valve, control means therefor comprising a control valve controlled by the regulated pressure, a plurality of valves operable by fluid pressure to assume one operative position and operable upon release of the applied fluid pressure to assume another operative position, means for applying fluid pressure for operating said plurality of valves, a source of fluid pressure for supplying the fluid pressure for said pressure application, a valve operable by said fluid pressure for connecting said source with said means for applying fluid pressure, means controlled by said control valve for admitting said fluid pressure to operate said last named valve, and conduits controlled by said plurality of valves whereby in one position thereof motive fluid is supplied to said motor for operating it in one direction and in the other position of said valves motive fluid is supplied to said motor for operating it in the other direction.

3. An apparatus whereby to control the operation of a reversely operable fluid-operated valve-operating motor in accordance with variations in pressure in a fluid conduit controlled by the valve operated by said motor, which comprises a plurality of independent pressure operated valves for controlling said motor, said pressure operated valves comprising a normally open inlet valve and normally closed exhaust valve for one side of the motor and a normally closed inlet valve and normally open exhaust valve for the opposite side of the motor, a source of fluid pressure, means connectible with said source for applying fluid pressure to operate said valves, said valves when subjected to such fluid pressure application assuming position for operation of the motor in one direction and when released from such action assuming position for operation of the motor in the opposite direction, means for furnishing fluid pressure from the conduit controlled by said motor-operated valve, and means controlled by said last mentioned fluid pressure for alternately connecting and disconnecting with said source the means for applying fluid pressure for operation of said pressure operated valves.

4. The improved means whereby to control a reversely operable fluid-operated valve-operating motor in accordance with variations in pressure in a fluid conduit controlled by the valve operated by said motor, which comprises a plurality of pressure operated valves controlling the application of motive fluid to the motor, a pressure line connected with said conduit, a different source of fluid under pressure, a means for making a fluid pressure application for operating said plurality of valves, a valve operable for admitting pressure from said source to said means for making the fluid pressure application and for venting said means when the supply of fluid is shut off therefrom, said last mentioned valve being operable by pressure to one position and operable upon release of pressure to its other position, a conduit for conducting fluid from said source for operating said last mentioned valve, and a control valve controlled by pressure in said pressure line connected with said last mentioned conduit for alternately closing and venting the same, thereby causing the alternate application of pressure for operating said plurality of valves and release thereof, said plurality of valves when subjected to the applied fluid pressure establishing a condition for operation of the motor in one direction and when released from such pressure establishing a condition for operation of the motor in the opposite direction.

5. The improved means whereby to control a reversely operable fluid-operated valve-operating motor in accordance with variations in pressure in a fluid conduit controlled by the valve operated by said motor, which comprises a control valve controlled by said pressure, a second valve operable by fluid pressure, means controlled by said control valve for applying fluid pressure for operating said second valve, means for venting said last named means when the fluid pressure is shut off therefrom, a plurality of motor controlling valves operable by fluid pressure to establish a condition for operation of the motor in one direction and operable upon release of fluid pressure to establish a condition for operation of the motor in the opposite direction, means controlled by said second valve for applying fluid pressure for operating said motor controlling valves, a source of pressure fluid under pressure for supplying said last named means, and means for venting said last named means when the said source is shut off therefrom by said second valve.

EDMUND BURKE.
ALFRED K. SORENSEN.